United States Patent [19]

Aubrey

[11] Patent Number: 4,605,843
[45] Date of Patent: Aug. 12, 1986

[54] EASY ACCESS TICKET TRANSPORT
[75] Inventor: Kenneth R. Aubrey, San Diego, Calif.
[73] Assignee: Cubic Western Data, San Diego, Calif.
[21] Appl. No.: 724,652
[22] Filed: Apr. 18, 1985
[51] Int. Cl.⁴ .................... G06K 13/00; G07B 15/00
[52] U.S. Cl. ................................ 235/33; 235/45; 235/475; 235/486
[58] Field of Search ............... 235/33, 45, 436, 444, 235/475, 486, 31 R, 31 T

[56] References Cited
U.S. PATENT DOCUMENTS 4,357,530 11/1982 Roes et al. ............... 235/475 X
4,377,828 3/1983 Hayman et al. ............ 235/475 X Primary Examiner—Benjamin R. Fuller
Attorney, Agent, or Firm—Brown, Martin & Haller

[57] ABSTRACT

A fare collection ticket transport that moves fare tickets through a closed alignment entry into an open longitudinal slot with a portion of the ticket projecting from the slot, and the portion of the ticket in the slot having the information processed by read, write, and verify components, so that the patron rider has to release the fare ticket, and the transport mechanism moves the fare ticket in the slot in a manner that the patron rider sees the fare ticket moving through the slot and can grab it at anytime he wants, with the transport mechanism moving the ticket at a determined speed and with the open longitudinal slot having protection against vertical entry.

20 Claims, 17 Drawing Figures

EASY ACCESS TICKET TRANSPORT

BACKGROUND OF THE INVENTION

Many transit systems now use automatic fare ticket processing systems in which patron riders insert tickets into ticket transports that move the fare tickets past magnetic read heads, or similar processors, that verify the ticket and allow the passenger to pass onto a train or transit vehicle. In many of such systems, a fare ticket will be purchased having multiple rides stored as information on fare tickets. This can be in the form of multiple rides, in which a ticket is inserted into a ticket transport unit that removes one ride for one passage through the ticket transport mechanism, or the ticket may have a stored value from which the read mechanism in the ticket transport reads the stored value and then removes an appropriate sum from the stored value to cover the particular ride.

In such systems, the fare ticket normally passes into a ticket receiving housing in which the ticket is processed. After verification, the ticket is then returned to the transit patron, and the entry gate is opened for the passenger to pass through. If there is a malfunction in the ticket processing equipment, the ticket will remain in the housing and is not readily recoverable. The patron rider then has to contact a supervisor, if one is available, to open up the ticket housing and recover his ticket. Such malfunctions or jamming can occur because of the operation of the system, or because of loss of power, or for other reasons. Nonreturned fare tickets can also occur because of insufficient rides or stored value on the fare ticket. In any of these cases, the patron rider may not understand the reason why his ticket is being withheld.

Some transit systems believe that their riders feel very uncomfortable in placing large stored value or stored rides in fare tickets for future transit rides, then seeing the tickets go into the slot of a ticket transport from which the patron rider may not receive the ticket back even though the patron rider knows there is a large stored value in the ticket.

The rider having lost his ticket, then has to appeal to the transit supervisor. This is time consuming to the transit supervisor; that's assuming one is available. Thus, there is a need and a desire for a ticket processor in which the patron rider can observe fare tickets passing through the ticket transport, and with the patron rider having the ability to pull the ticket out of the transport, if there is a loss of power, or even if the rider thinks that things are not going well.

While ticket readers, such as wipe-readers, have been used in other systems; they are not usually applicable in automatic fare collection transit systems because of the patron rider can usually be expected to move the fare ticket through the reader or at a skewed angle to the readers or at varying speeds, oftentimes with jerks, and can be expected to pull the fare ticket out of the wipe-reader before it makes a complete pass through the wipe-reader slot. This also makes it difficult to provide both read, write, and verifying functions relative to the ticket, where for instance there is stored value or stored rides thereon. So, there is a need for an improvement in the processing of fare tickets in automatic fare collection ticket transport systems that meet the requirements of the transit system, as well as satisfying the long felt needs and desires of the patron riders.

SUMMARY OF THE INVENTION

To provide a solution to the long felt want need and desire of the transit systems and the patron riders as previously expressed, this invention comprises a ticket transport having an open longitudinal slot for receiving and passing fare tickets for processing. In one embodiment there is a closed entry for fare tickets to pass through in the open end of the slot. The fare tickets are aligned with the slot and the readers and are then grasped by a moving means that moves fare tickets through the enclosure at a determined speed in and through the slot. The tickets move in the slot with the upper portion of the ticket projecting above the slot so that the patron can see his ticket moving through the transport and can grab and remove the ticket, if required. The ticket cannot normally be jammed such that the patron rider can not retrieve the ticket himself. Thus, the patron rider does not have the feeling that he is going to lose his ticket. The transport mechanism moves the ticket past the read, write-encode, and verify heads at the determined speed, which allows effective reading as well as writing and encoding on the ticket. At the end of its movement, the fare ticket is stationary at the end of the slot. At this point, the ride information on the fare ticket has been processed and the gate for the passenger to pass through is opened. The rider then removes the fare ticket from the rest position in the slot, in clear view, and proceeds on to the transit vehicle. Where desired, such as when there is no fare left on the ticket, the ticket can be captured at the end of the slot.

Should there be any failure in the system or in the power operating the system, or should there be a jam in the ticket processing mechanism; then the rider can remove his own ticket thus unjamming the ticket moving and processing mechanisms. This has the attendant advantage of not requiring an immediate supervisor to constantly tend the ticket mechanisms to clear jammed ticket transport means.

The enclosure has a ticket receiving opening with bezel shaped sides that align the ticket with slot, both longitudinally and vertically. The open slot has protection means that serve to prevent the vertical entry of a ticket in the slot, while allowing longitudinal movement of the ticket in the slot. The slot protection means can also protect against entry of foreign objects into the slot that could damage the reader heads.

Additionally, the system of this invention has other modes of covering the entry of fare tickets into the open end of the slot, to cause the patron rider to release the fare ticket. Also, if the fare ticket is not placed in the system correctly, e.g., the magnetic band carrying the stored information is not correctly oriented in entry into the slot to be read by the read head and processed by the write head, then the read head or sensors in the ticket transport immediately activate a reverse mechanism in the transport system that runs the moving means in reverse, returning the fare ticket to the patron. The patron then reinserts the fare ticket, assuming it's a correct fare ticket, in the correct orientation to be read and encoded by the appropriate magnetic heads in the ticket transport. All the time the patron is observing his fare ticket and can see any problems that arise and can clear the mechanism himself and reinsert his fare ticket into the open end of the slot. The transport mechanism then moves fare tickets through the slot at the correct determined speed to permit read, write, encode, and verify functions.

It is therefore an object of this invention to provide a new and improved ticket transport for receiving and processing fare collection tickets.

Other objects and many advantages of this invention will become more apparent on a reading of the following detailed description and an examination of the drawings, wherein like reference numerals designate like parts throughout and in which:

DETAILED DESCRIPTION OF THE INVENTION

Figure 1:
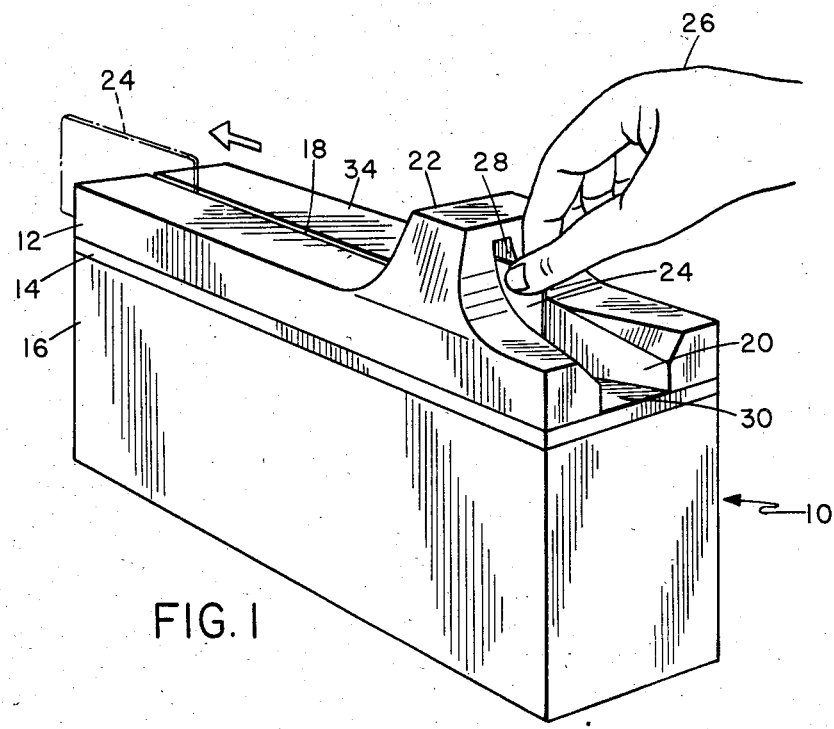
FIG. 1 is a perspective view of an embodiment of the ticket transport illustrating the method of use.

Referring now to FIG. 1, the ticket transport 10 comprises an upper housing 12 resting on a base plate 14 that in turn rests on lower housing 16. Lower housing 16 houses motor 102 (See FIGS. 3 and 5) and the circuit components of FIG. 5. The moving means of the ticket transport are positioned on base plate 14 under housing 12.

Housing 12 has an open longitudinal slot 18 through which the fare ticket 24 is transported by the moving means of the ticket transport means. An enclosure means 22 is formed by the housing 12 in which the open receiving end of the longitudinal slot 18 is located. The enclosure means covers the upper portion of the fare ticket 24 as the ticket moves down slot 18 in the direction of the arrow. As can be seen, a portion of ticket 24 projects above the upper flat surface 34 of housing 12, so that the fare ticket is observable by the patron rider at all times in its movement in slot 18, and may also be grasped by the patron rider once the ticket passes through the enclosure means 22.

Figure 16:
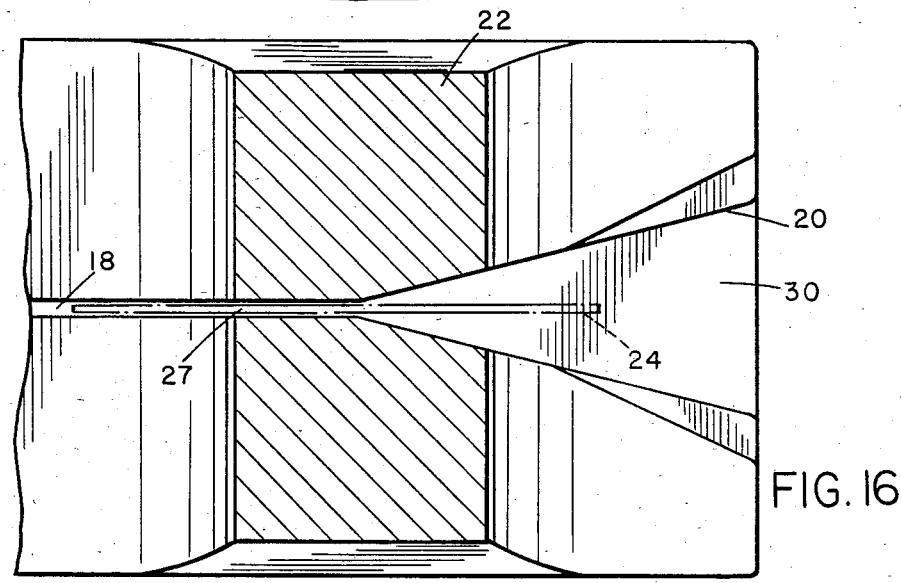
FIG. 16 is a sectional view taken on Line 16—16 of FIG. 15.
Figure 17:
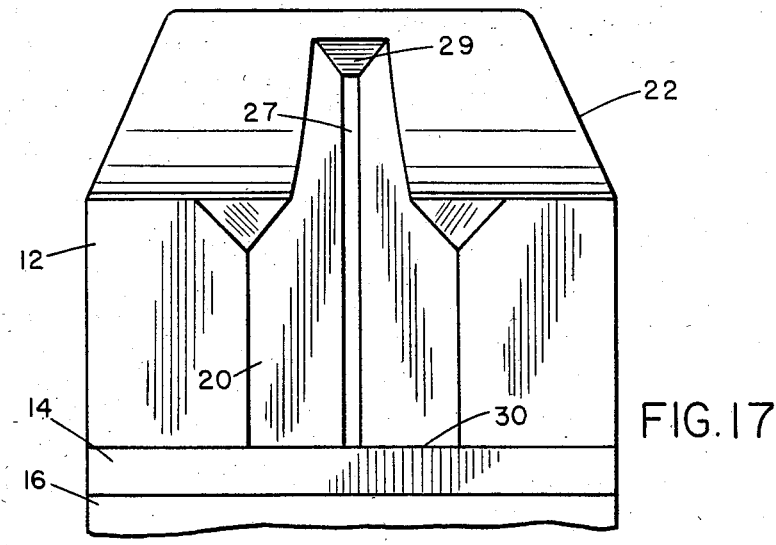
FIG. 17 is a front end view of the enclosure and entry slot.

The opening 28 is formed by bezel surfaces 20 and 29 (see FIGS. 15, 16, and 17) that guide or force the ticket in an aligned position to pass through opening 28. Surface 31 is spaced from the lower surface 30 a distance slightly larger than the height of the ticket 24 with the side space being about three times the width of the ticket, so that when the ticket passes through space 27, it is correctly aligned with slot 18 and the read and write means.

In operation the ticket 24 is inserted by resting the lower flat edge against surface 30. The ticket is then moved through directing surfaces 20 through opening 28 and space 27 into slot 18 by hand 26. The moving means grasps the ticket at the point illustrated in FIG. 1, whereupon the hand 26 of the patron rider releases the fare ticket and the fare ticket is moved in the direction of the arrow, to the rest position as illustrated in FIG. 1. The longitudinal width of the enclosure 22 is less than the length of a transit ticket so that the patron rider can always grasp one end or the other of the ticket to free the ticket if the ticket becomes jammed when in enclosure 22.

Figure 2:
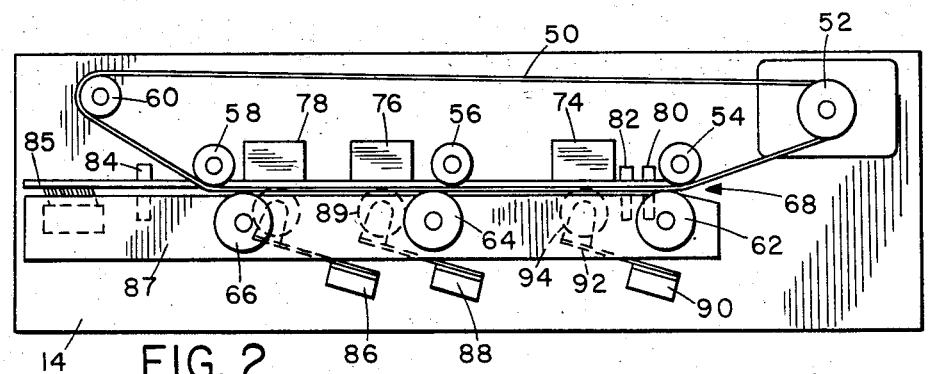
FIG. 2 is a top plan view of the ticket transport with the cover removed.
Figure 3:
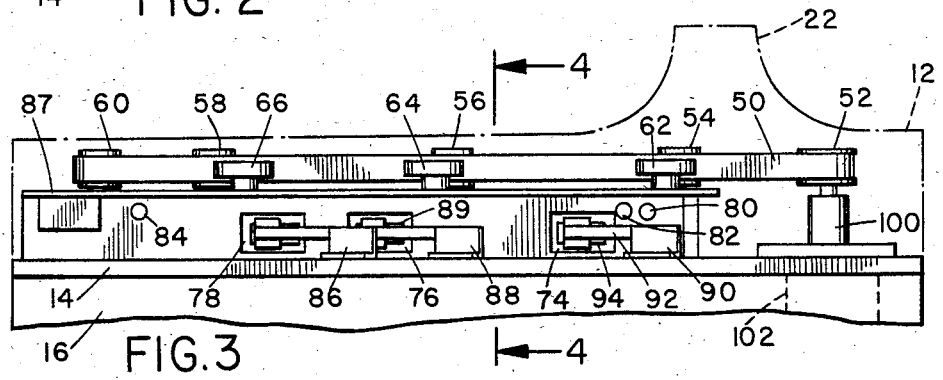
FIG. 3 is a side elevation view of the structure of FIG. 2.
Figure 4:
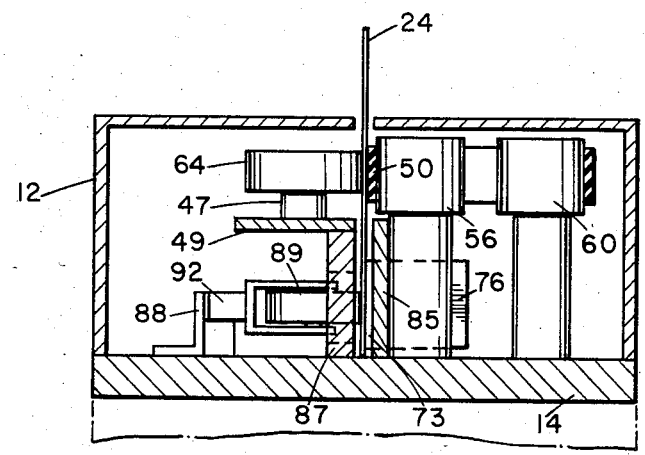
FIG. 4 is an enlarged sectional view taken along Line 4—4 of FIG. 3.

Referring to FIGS. 2, 3, and 4, the moving means of the ticket transport comprises a roller 52 driven by drive gear 100 that is in turn driven by motor 102. Belt 50 is positioned on roller 52 and in turn on idler and positioning rollers 54, 56, 58, and 60. Thus, the endless belt forms a roller means that is driven by drive roller 52.

Rollers 62, 64, and 66 bear against the outer surface of endless belt 50 and provide frictional compression against a fare ticket that is moving from entry point 68 through to exit point 67. This compressive frictional force between the respective rollers 54 and 62, 56 and 64, and 58 and 66 provide sufficient compressional frictional force to move the fare ticket at a positive and predetermined speed; and yet the frictional forces are such that the fare ticket may be removed from the constricted space between the rollers and the endless-belt drive by the patron at the patron's election. The endless belt 50 leaves the fare ticket surface at point 70, at which point the fare ticket is no longer driven in slot 18, and is at the rest position as illustrated in FIG. 1. Lower plate 85 helps define the slot on one side with the adjacent surface of housing 87 being the other side through which the fare ticket passes. These two members stabilize the fare ticket at the point below the drive belt 50.

The ticket 24 has on its lower surface on one side thereof a magnetic band on which is stored the fare information, the identification information, and other pertinent information for use in fare collection systems as are known in the art. It is to be understood that any data reading, writing, and recording systems may be used, such as optical or inductive systems. For correct processing of the ticket 24, it is necessary that the fare ticket be oriented so that band 73 is on the side and surface as illustrated in FIG. 4, so that the magnetic information may be read by the respective read head 74, write head 76, and verify head 78. Spring rollers 86, 88, and 90 each have, as for example, a roller 89 or 94 supported on leaf spring biasing member 92 that biases respective rollers in the direction of the read, write, and verify heads. These rollers insure correct positioning of the magnetic band 73 relative to the read, write, and verify heads—74, 76, and 78, respectively.

Sensor devices 80 and 82, which may be optical, magnetic, or inductive, sense the movement of the fare ticket through the slot 18 and 67, and thus turn on the transport system when the fare ticket is inserted at point 68. Sensors 80 and 82 also sense the direction of movement of the fare ticket for the operation of the circuit in FIG. 5. Sensor 84 senses when the fare ticket is at the exit position as illustrated in FIG. 1.

The control system for controlling the moving means and the read, write, and verify means, and that also provides operational control of other components from the information read from the magnetic band on the ticket 24 (see FIG. 5), is controlled by a microprocessor 202. The microprocessor 202 is programmed in its operation by a program prom 204 through bus 212 and 208. The read-only memory 206 stores information read from the information on the magnetic strip on the fare ticket and stores this information for processing, which is accessed by the microprocessor through bus 214 and 208. The read head 74 reads information from the fare ticket, which is fed through lines 220 to the microprocessor 202. After all the pertinent information is read from the ticket 24, this information is stored in RAM 206, then the program prom 204 provides the instructions to the microprocessor 202 to instruct the write head 76 through lines 222 to write the appropriate information on the fare ticket. The verify head 78 then reads this information and feeds this information through lines 224 to the microprocessor 202, which verifies that the information fed applied by the write head to the fare ticket is correct.

Assuming that the read head reads the appropriate information from the fare ticket and finds that there is a sufficient number of stored rides or a sufficient amount of stored value on the fare ticket for the particular ride that the fare ticket 24 is being processed; then this information is displayed on display 228 and an appropriate signal is sent through lines 229 to the gate release to allow the patron to pass through to the transit vehicle, or to ring an alarm if a problem regarding the fare ticket is detected.

In operation, the fare ticket is inserted into the slot 18 through opening 28 of housing 12. Sensor 80 and 82 detect the presence of the fare ticket and engages the power supply 230, which feeds power through lines 232 and 233, and through lines 242 and 244, and through the respective power buffers 246 and 248 to motor 102. Motor 102 then drives drive roller 52 rotating the endless belt 50, which pulls the fare ticket 24 between idler rollers 54 and 52 and thus transports the fare ticket 24 through slots 18 and 67 to the rest position. Detectors 80 and 82 also determine the direction of movement of the fare ticket 24 through the system. Detector 84 detects when the fare ticket is in the rest position and then de-energizes the power supply that in turn de-energizes the moving means through de-energizing motor 102. In the fare ticket passing by the respective heads 74, 76, and 78, the appropriate information is provided to the microprocessor, as previously described.

Should sensors 80 and 82 sense that something other than an appropriate fare ticket is inserted at point 68 in the open end of slot 18, then these sensors will not energize motor 102, and the ticket transport will not energize the moving means to grasp and move the fare ticket through slot 18. Alternatively, should the read head 74 not read appropriate information from the fare ticket 24, or the verify head 78 does not verify that the appropriate information was written on the magnetic medium of fare ticket 24, then this information will be fed to the microprocessor 204 that will energize motor 102 to drive in the reverse direction, thus causing the endless belt 50 to be rotated in the reverse direction moving the fare ticket or other entry in slot 18 opposite to the arrow in FIG. 1, and to the position of fare ticket 24 as illustrated in FIG. 1. All the time, the patron rider is observing this and understands what is occurring and will either reinsert the fare ticket 24 so that it will be processed by the ticket transport, or will not attempt to enter through the closed gate. The patron rider can or will remove his fare ticket from the system, and if he doesn't, the next patron rider will observe the situation and he will remove the obstructing fare ticket so that the second patron rider can insert his fare ticket to be processed, so he can go ahead to the bus, subway car, train car, or the like.

The motor 102 is driven at a given determined speed, so that the ticket moves at the determined speed past the read, write, and verify heads, so that the information is read correctly and also so that the write head can write information appropriately onto the magnetic medium of the fare ticket 24. Should the patron rider remove the fare ticket prior to its passage through to the rest position 24, then after an appropriate time lapse sensor 84 will detect this and the system will be deactivated by the microprocessor. Also, the gate release will not be operated, but a signal will be passed through line 229 to the ring alarm.

Figure 6:
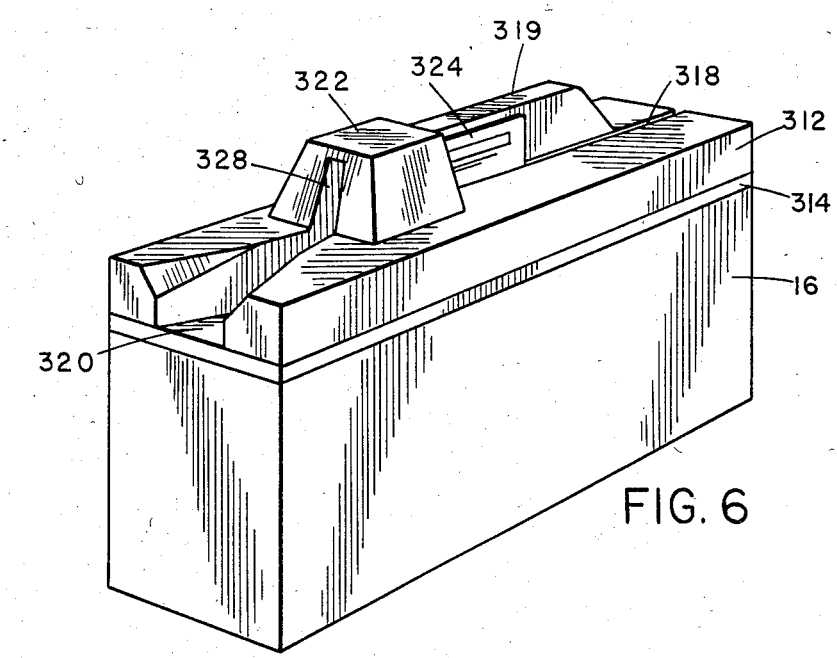
FIG. 6 is a view similar to FIG. 1, showing an alternative enclosure over the fare ticket entry.
Figure 7:
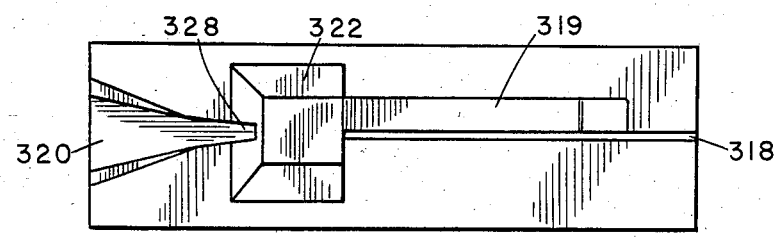
FIG. 7 is a top plan view of the configuration of FIG. 6.
Figure 9:
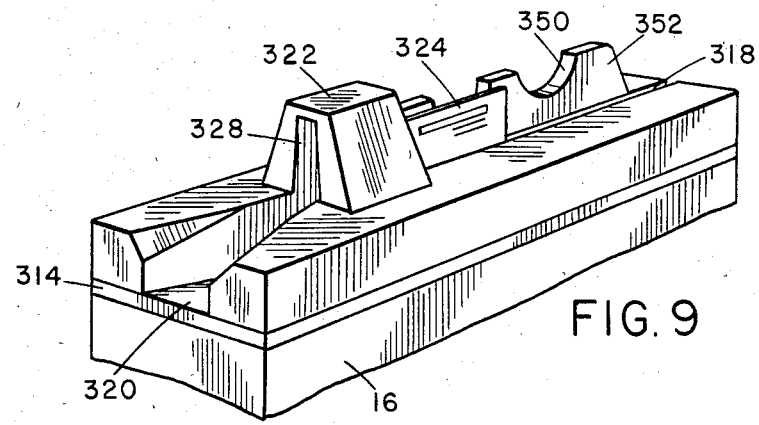
FIG. 9 is a view similar to FIG. 6, showing another configuration of the fare ticket entry enclosure.

Referring to FIGS. 6 and 7, there is illustrated a modified embodiment of the enclosure means, which enclosure means 322 has a shoulder portion 319 that is positioned along one side of the slot 318. Thus, when the fare ticket 324 is inserted through opening 320 and opening 328, the determined movement of the fare ticket 324 is protected in its movement by shoulder 319 against inadvertent interruption of its operation by, for example, the patron rider having placed his arm or hand across slot 318. Yet, if the system is inactivated or becomes jammed, then fare ticket 324 can be removed by grasping the ticket and sliding it upwardly against shoulder 319 out of the slot 318. Referring to FIG. 9, the shoulder is modified by recesses 350 in shoulder 352 to permit the patron-rider's fingers to directly grasp the ticket 324 and pull it out of slot 318. The opening 328 in FIGS. 6 and 9 is shaped as disclosed in FIGS. 15, 16, and 17.

Figure 8:
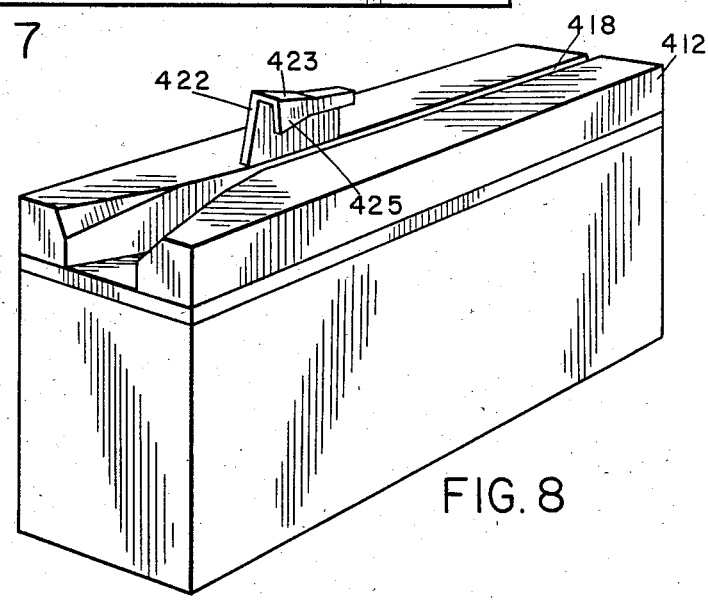
FIG. 8 is a view similar to FIG. 6, showing a further configuration of the fare ticket entry enclosure.
Figure 15:
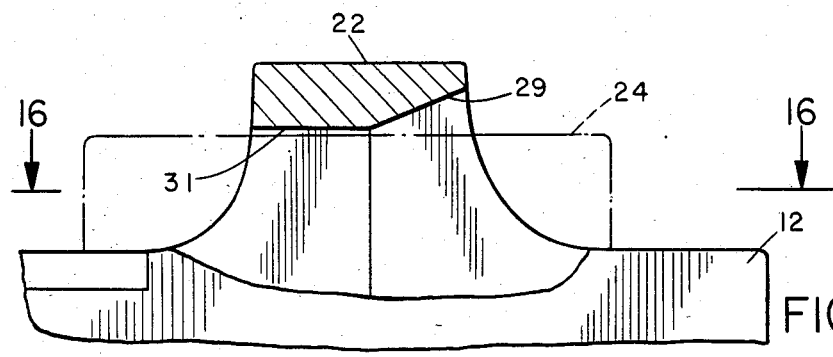
FIG. 15 is an enlarged side elevation view of the enclosure means, partially cut away to show the entry slot.

FIG. 8 illustrates still another embodiment of the enclosure means in which the enclosure 422 has a portion 423 with an end 425 that is spaced from the surface 434 of housing 412. Thus, the entire movement of the fare ticket 324 in slot 418 is observable by the patron rider, yet the housing 422 still functions to cause the patron rider to release the fare ticket 324 in its transported movement in slot 418. The internal configuration of housing 422 is shaped as illustrated in FIG. 15.

Figure 11:
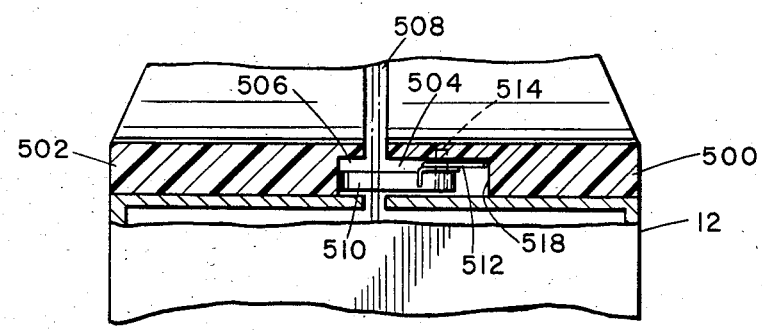
FIG. 11 is a sectional view taken along Line 11-11 in FIG. 10.
Figure 10:
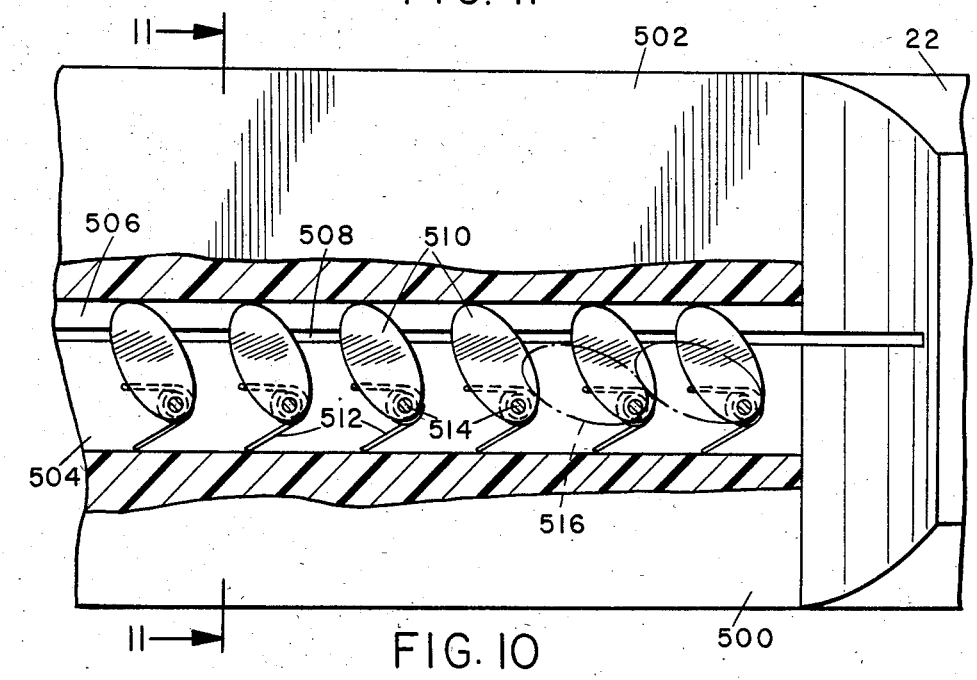
FIG. 10 is a partial top plan view with parts broken away of the slot with the movable protector means.

Referring now to FIGS. 10 and 11, there is illustrated a movable protection means for protecting the slot 18, the read and write heads within slot 18, and also for preventing or restricting the misinsertion of the transit ticket 24 into slot 18 at a point beyond the enclosure 22. In this embodiment, solid leaf members 510 are pivotally supported on pin 14, with spring 512 being connected at one end to the movable leaf member 510 and with the other end of the spring 512 abutting against surface 518.

Thus, when the transit ticket exits from housing 22 and moves down slot 508, it contacts the respective leaf members 510 moving the leaf members out of the slot opening 508 as illustrated by the position of the leaf member 516 in dotted illustration.

The movable leaf members 510 are positioned in the open spaces 504 and 506, which spaces are formed by members 500 and 502 that are secured to the upper surface of housing 12. Members 500 and 502 may be of any suitable metal or plastic that is secured in any appropriate manner to upper surface of housing 12.

It may be observed, that when the leaf members 510 are in the position as shown in FIG. 10, the leaf members cover the slot 508 sufficiently, to make it difficult to insert foreign objects into the slot 508 to the extent that such objects contact the surfaces of, e.g., magnetic heads that project into the space of slot 508. Yet, when moved to the retracted position by the movement of ticket 24, then the ticket passes directly through slot 508.

Figure 5:
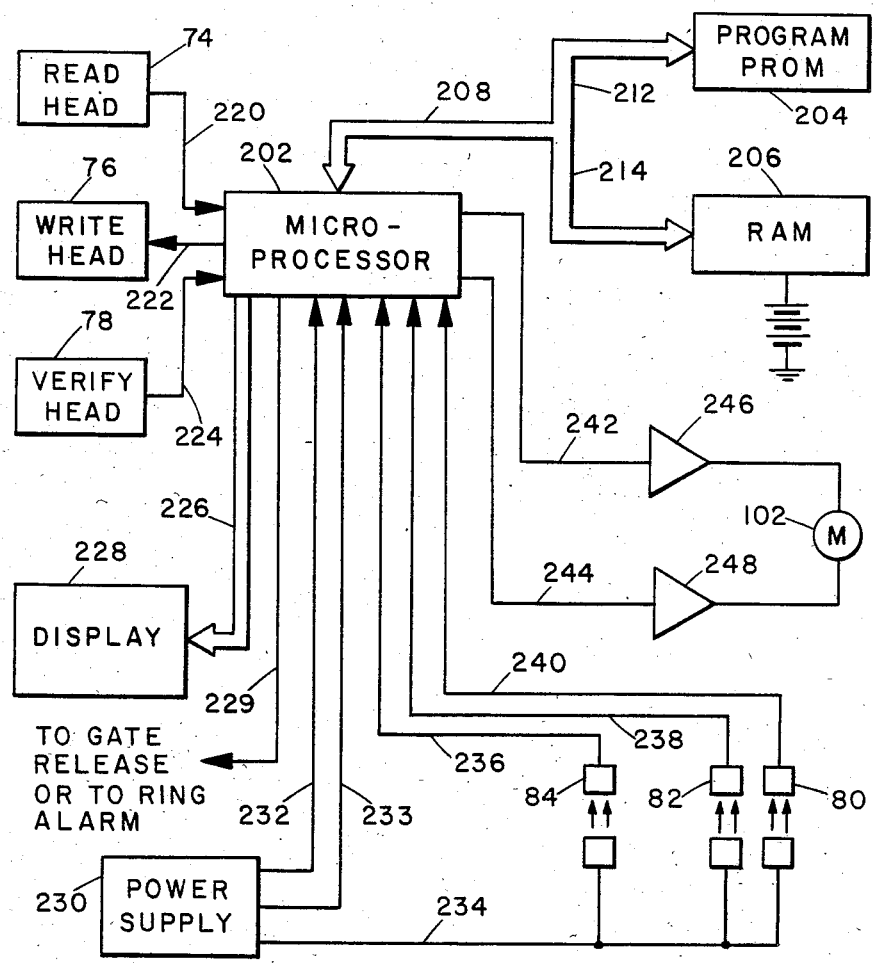
FIG. 5 is a block diagram of the actuating system and the ticket information processing system.

In operation, when a ticket is identified by sensing means 80 and 82 (see FIG. 5), which detects the movement of a ticket into slot 508 from housing 522, and it is determined that the transit ticket 524 is not a correct transit ticket, or when the transit ticket 524 progresses to read head 74 and there is no reading provided from the information on ticket 24; then the control system of FIG. 5 causes the motor 102 to move in the reverse direction, moving the ticket backwards out of slot 508. It may be understood that the ticket at this point has not projected into slot 508 sufficiently to allow leaf members 510 to become positioned behind the ticket and prevent its movement in slot 508 back through the enclosure 22 to the position of the ticket as illustrated in FIG. 1.

Figure 12:
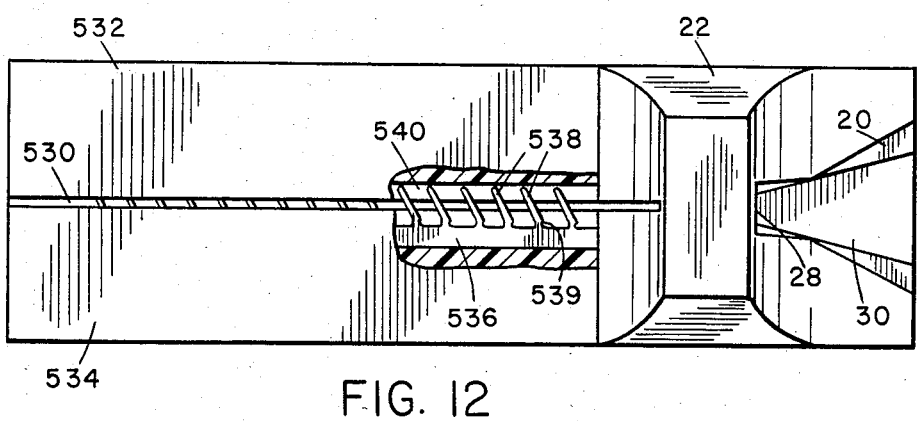
FIG. 12 is a top plan view showing an alternative configuration of the protector means.

Referring now to FIG. 12, there is illustrated another embodiment of the projecting means, which in this case comprises a plastic or metal band 536 having integral pin members 538 that bend at 539 sufficiently to allow the ticket 24 to pass through slot 30 in the manner previously described relative to FIG. 10.

Figure 13:
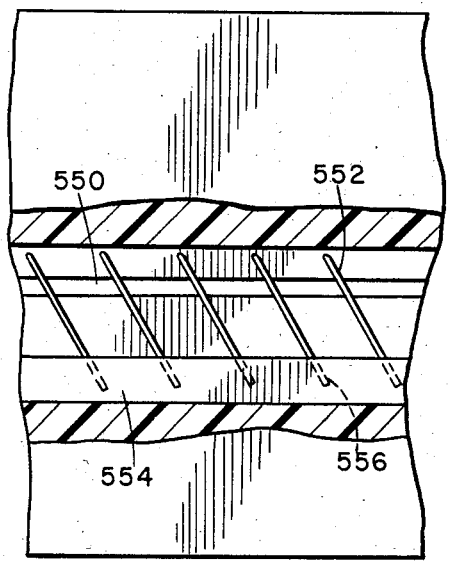
FIG. 13 is a top plan view showing another configuration of the protector means.

In FIG. 13, the pin projection members 552 project into slot 550 and are held in position by being flexible members with the end 566 held in a retaining opening in retaining member 554.

Figure 14:
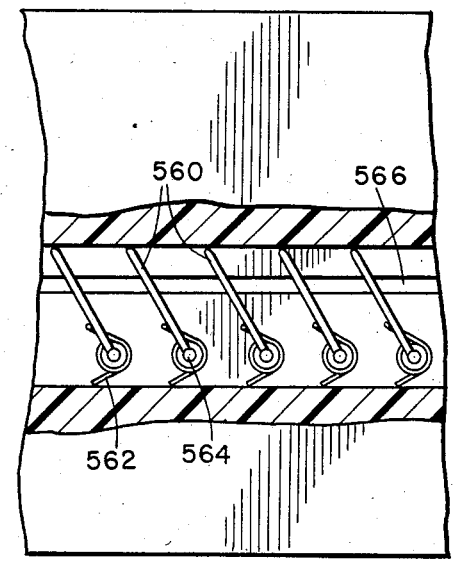
FIG. 14 is a top plan view of a further configuration of the protector means.

In FIG. 14, the pin members 560 are fixed at one end to a rotatable pin 564 that is biased to the position illustrated across slot 566.

It may be understood that with the passage of the fare ticket 24 through slots 550 or 566, then the leading edge of the fare ticket biases the respective flexible member 552 or the spring bias member 560 to a nonobstructing position. The fingers or projecting members 538, 552, and 560 all obstruct, restrain, or prevent the insertion of foreign objects, such as the transit ticket 24 in a vertical movement into the slot.

Having described my invention, I now claim:

1. A ticket transport for processing fare tickets received from a patron comprising:
    ticket transport means having an open longitudinal slot for receiving and processing fare tickets,
    read means for reading information from fare tickets when fare tickets move longitudinally in said slot,
    write means for writing information on fare tickets when fare tickets move longitudinally in said slot,
    said slot being open at the entry for receiving fare tickets,
    moving means for grasping fare tickets at the open end of said slot and moving fare tickets in said slot with a portion of the fare tickets projecting out of said slot,
    and enclosure means positioned over said slot adjacent the open end of said slot for covering a portion of the fare ticket, whereby fare tickets are removable from the patron's grasp when the patron inserts the fare ticket in the open end of said slot with the patron being able to grasp a portion of the fare ticket while in said slot.

2. A ticket transport as claimed in claim 1 wherein, said enclosure means having a longitudinal width that is less than the length of a fare ticket.

3. A ticket transport as claimed in claim 1 wherein, said enclosure means having an internal passage through which the fare ticket passes;
    and said internal passage having a height that is only slightly larger than the height of a fare ticket.

4. A ticket transport as claimed in claim 3 wherein, said internal passage having a width of about three times the thickness of the fare ticket,
    and bezel means in said enclosure means for moving a fare ticket into said internal passage.

5. A ticket transport means as claimed in claim 1 wherein,
    said enclosure means comprises a structure that encloses the upper surface of at least a portion of the fare ticket in passing through said enclosure.

6. A ticket transport means as claimed in claim 1 wherein,
    said enclosure means having a shoulder portion extending longitudinally along one side of said open slot,
    and said shoulder extending away from said slot a distance slightly larger than the upper edge of the fare tickets.

7. A ticket transport as claimed in claim 6 wherein, said shoulder having at least one recessed opening means for receiving the fingers of a patron in grasping and pulling a fare ticket from said slot.

8. A ticket transport as claimed in claim 1 including, verify means in said ticket transport means for reading information on fare tickets and verifying and providing an output signal that a fare ticket passing through said slot is not a correct ticket or is not in correct orientation,
    and reverser means for reversing the movement of the fare ticket in said transport in response to an output signal from said verify means.

9. A ticket transport as claimed in claim 1 wherein, said read means and said write means and said verify means being positioned adjacent said open longitudinal slot.

10. A ticket transport as claimed in claim 1 wherein, said moving means having means for positioning fare ticket at the end of movement of fare tickets in said slot, whereby fare tickets may be manually removed from the slot by the patron.

11. A ticket transport as claimed in claim 1 wherein, said moving means comprising rotating means that pressure contacts fare tickets and moves fare tickets in said slot,
    and fare tickets being removable from the pressure hold by said moving means in said slot from said enclosure means to said exit position.

12. A ticket transport as claimed in claim 1 wherein, said moving means comprising roller means for frictionally grasping fare tickets and for moving fare tickets in said slot from the open end to an exit end of said slot,
    and said roller means being spaced from the exit end of said slot a distance greater than the length of a fare ticket.

13. A ticket transport as claimed in claim 1 including, drive means for moving said moving means and fare tickets at a substantially constant speed.

14. A ticket transport as claimed in claim 1 wherein, said ticket transport means having a flat external surface with said longitudinal slot positioned in said flat surface, and said enclosure means extending above said surface enclosing the upper portion of fare tickets that pass there through in said said slot.

15. A ticket transport as claimed in claim 1 including, movable projecting means projecting in said slot along the longitudinal length of said slot for restricting movement of objects into said slot at points along the length of said slot, which points are spaced from said open end of said slot.

16. A ticket transport as claimed in claim 15 wherein, said movable projecting means including resilient means for resilient means for resiliently biasing said projecting means from a first position outside of said slot to a second position in said slot.

17. A ticket transport as claimed in claim 16 wherein, said movable projecting means being positionable at an acute angle to the direction of movement of the fare ticket in said slot, whereby said fare ticket contacts said movable projecting means and moves said movable projecting means to a position permitting passage through said slot.

18. A ticket transport as claimed in claim 17 wherein, said movable projecting means comprising a plurality of pin members.

19. A ticket transport as claimed in claim 17 wherein, said movable projecting means comprising a plurality of leaf members.

20. A ticket transport for processing fare tickets received from a patron comprising:

ticket transport means having an open longitudinal slot for receiving and processing fare tickets, said slot being open at the entry for receiving fare tickets, moving means for grasping fare tickets at the open end of said slot and moving fare tickets in said slot with a portion of the fare tickets projecting out of said slot, and enclosure means positioned over said slot adjacent the open end of said slot for covering a portion of the fare ticket, whereby fare tickets are removable from the patron's grasp when the patron inserts the fare ticket in the open end of said slot with the patron being able to grasp a portion of the fare ticket while in said slot.

* * * * *